July 6, 1971 YUICHI KONO ET AL 3,591,414

METHOD FOR PRODUCING A MAGNETIC RECORDING MEDIUM

Filed July 5, 1968

INVENTORS
YUICHI KONO
GORO AKASHI
MASAAKI FUJIYAMA

BY
Sughrue, Rothwell, Mion,
Zinn & Macpeak
ATTORNEYS

United States Patent Office 3,591,414

Patented July 6, 1971

3,591,414
METHOD FOR PRODUCING A MAGNETIC RECORDING MEDIUM

Yuichi Kono, Goro Akashi, and Masaki Fujiyama, Kanagawa, Japan, assignors to Fuji Photo Film Company, Ltd., Kanagawa, Japan Filed July 5, 1968, Ser. No. 742,602
Claims priority, application Japan, July 4, 1967, 42/43,006, 42/43,007
Int. Cl. H01f *10/00*
U.S. Cl. 117—237 10 Claims

ABSTRACT OF THE DISCLOSURE

The formation of drop-out in magnetic recording or reproducing of a magnetic recording tape caused by scraps of the magnetic recording layer on the tape can be prevented by treating the edges of the magnetic recording layer, after cutting the wide magnetic recording sheet into desired width, with an organic solvent to smoothen the edges. A resinous composition may be coated on the edges instead of the solvent treatment.

BACKGROUND OF THE INVENTION

This invention relates to a method for producing a magnetic recording medium such as a magnetic recording tape, sheet or disk. Magnetic recording media characteristics vary considerably. One cause of the variation is the "drop-out" phenomenon which is caused by the differences in the uniformity of the magnetic coating onto the base which tends to affect the sensitivity, noise level, distortion, bias variation, transfer and erasing properties, "Drop-out" refers to the omission of information on the tape or recording medium during very brief intervals which makes it difficult to produce a completely accurate recording.

The drop-out phenomenon is markedly increased as the speed of the magnetic recording medium relative to the magnetic recording head is raised, as in video recording and also as the wave length used in the recording is shortened. Therefore, since the production yield is dependent on the drop-out rate, it is important to reduce drop-out so as to reduce costs of production.

It has now been discovered that the drop-out rate is caused by the embedding of foreign materials into the magnetic layer which may project from the surface by amounts as small as 2–3$\mu$. Small portions of the magnetic layer which have been stripped from the base also tend to increased drop-out if such portions continue to adhere to the surface of the magnetic layer after they have been stripped away.

When a magnetic layer having a uniform surface is transported across a magnetic recording head as shown in FIG. 1 which is explained hereinbelow, no drop-out phenomenon occurs. However, if foreign particles adhere to the surface of the magnetic layer, the magnetic recording head moves apart from the surface of the magnetic layer by a distance determined by the height of the adhering foreign materials when the head comes to the portion of the magnetic layer where the foreign materials adhere. If the foreign materials are non-magnetizable, neither the portions of the magnetic recording layer lying in front of or behind the foreign materials, nor the portion of the recording medium where the foreign materials are adhered will bear the proper infomation, thereby resulting in a serious defect in the recording. Alternatively, if the foreign materials are of a magnetizable substance, the portions of the magnetic recording layer lying in front of and behind the portion at which the head is raised from the surface of the magnetic recording layer will not bear the proper information, thereby also resulting in a serious defect in the recording. In order to prevent foreign materials from adhering to the magnetic layer after it is coated onto the base so that such a drop-out phenomenon is decreased, factories for producing magnetic recording medium are equipped with means for removing dust. However, it is still impossible to completely prevent the drop-out phenomenon from occurring even if the factory is equipped with effective means for removing dust.

The present inventors have now found that, when the tape is cut to appropriate widths after it is coated with a magnetic recording layer, chips from the operation are often scattered and thereafter adhere to the surface of the magnetic recording layer causing the drop-out phenomenon in the recording and reproducing processes. Presumably, the scattered chips are adhered to the surface due to static electricity and are thereafter pressed into the recording medium when it is being reeled. The reason why the chips are formed at all is presumably because the magnetic layer has a very low mechanical strength, since it contains 30–40% by volume of a magnetizable substance.

Although it has been suggested to reduce drop-out by reducing the occurrence of chips, such methods as using different cutting systems, such as leather cutting systems, shear cutting systems, score cutting systems, lap-around shear cutting systems, and the like have not proved satisfactory in avoiding the problem.

It is an object of the present invention, therefore, to obtain a novel and useful method for producing a magnetic recording medium which avoids the above-described disadvantages of the prior art.

SUMMARY OF THE INVENTION

The present invention provides a novel and useful method for producing a magnetic recording medium which reduces the problems of drop-out.

In accordance with the present invention, the cut edge surface of the magnetic recording medium is treated with an organic solvent to remove any cut chips thereon. Alternatively, a resinous liquid consisting of a resinous material dissolved in a volatile organic solvent, can be applied to the cut edge surfaces of the magnetic recording medium to fix the chips in the coating so as to eliminate drop-out.

DETAILED DESCRIPTION OF THE PREFERRED EMBODIMENTS

Figure 1:
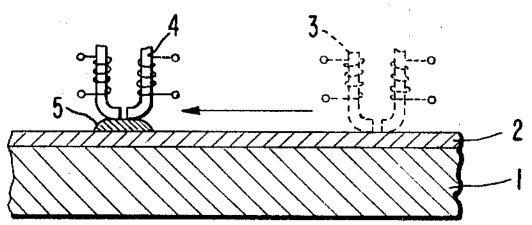
FIG. 1 is a schematic view showing the manner in which a magnetic recording medium is used.

As shown in FIG. 1, when a magnetic layer 2 on base 1 having uniform flat surface is advanced across the side of a magnetic head 3 illustrated by broken line, no drop-out phenomenon occurs. However, if foreign material 5 adheres to the surface of magnetic layer 2 and magnetic head 4 reaches said foreign material 5 as shown in FIG. 1, head 4 is raised from the surface of magnetic recording layer 2 by the height of foreign material 5. Therefore, the areas in magnetic recording layer 2 lying in front of and behind said foreign material 5 as well as the area on which foreign material lies will not bear the proper recording, if the foreign material 5 is of non-magnetizable substance. If the foreign material 5 is of a magnetizable substance, the areas in magnetic layer 2 lying in front of and behind foreign material 5 will not bear the proper recording.

Figure 2:
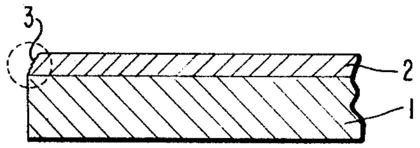
FIG. 2 is a schematic lateral cross-sectional view showing a magnetic recording medium which is inappropriately cut to cause the destruction of the magnetic recording layer.

FIG. 2 shows a magnetic recording medium of the prior art. As shown in FIG. 2, the cut edge 3 of the magnetic layer 2 is destroyed by inaccurate cutting operations, thereby resulting in a scattering of cut chips 5 which adhere to the surface of magnetic layer 2. This causes the occurrence of drop-out in the magnetic recording and reproducing processes.

Figure 3:
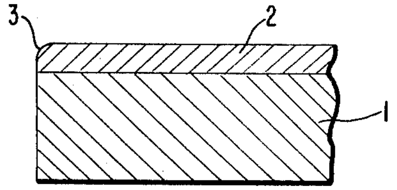
FIG. 3 is a schematic lateral cross-sectional view showing the magnetic recording medium treated by an organic solvent in accordance with one embodiment of the present invention.
Figure 4:
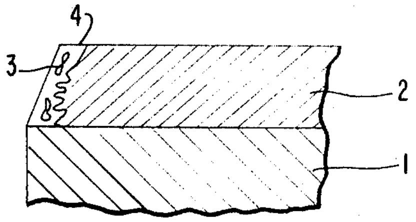
FIG. 4 is a schematic lateral cross-sectional view showing the magnetic recording medium treated by a resinous liquid in accordance with another embodiment of the present invention.

As described previously, the present invention provides a method which prevents the cut chips from being scattered from the cut edge surfaces by treating the cut edges of the magnetic recording medium with an organic solvent capable of dissolving the binder used in the magnetic layer. As shown in FIG. 3, the magnetic layer 2 is provided on a base 1 and the cut edges of the layer are treated so as to give smooth edges 3. As shown in FIG. 4, the same results can be obtained by applying a resinous liquid to the cut edges so as to fix the cut chips in the coating. As shown, the magnetic layer 2 is provided on a base 1 and the cut edge 4 of the layer is coated with a resinous liquid so as to fix the cut chips in the coating providing smooth edges 3.

Examples of the present invention will be described hereinbelow with reference to the comparative example of the prior art:

COMPARATIVE EXAMPLE OF THE PRIOR ART

A magnetizable layer comprised of 300 parts of $$\gamma\text{-}Fe_2O_3$$

90 parts of a copolymer of vinyl chloride and vinyl acetate, 20 parts of nitrile rubber, 15 parts of plasticizer and 600 parts of butyl acetate and having the thickness of 12$\mu$ in dry state was formed on the surface of a base comprised of triacetyl cellulose and having the thickness of 25$\mu$ to which an undercoating of amorphous polyester resin was applied. The magnetic tape so formed had a width of 25 cm. and a length of 800 mm. The tape was cut in the width of 50.8 mm. so as to divide the tape into four strips by utilizing lap-around shear cutting system. Thus, four video tapes having a width of 50.8 mm. and a length of 800 mm. were produced. Drop-out was measured by means of a four head video tape recorder (VTR VR-1000 made by Ampex Co.). The test results were shown in Table 1.

TABLE 1

Number of drop-outs in the comparative example of the prior art (counts of drop-out/min.)

| Position of measurement | Position of cutting: First slit | Second slit | Third slit | Fourth slit |
|---|---|---|---|---|
| 1 | 15 | 12 | 8 | 12 |
| 2 | 18 | 16 | 16 | 14 |
| 3 | 5 | 14 | 11 | 19 |
| 4 | 31 | 14 | 20 | 26 |
| 5 | 26 | 23 | 38 | 25 |
| 6 | 19 | 21 | 15 | 18 |
| Average | 19 | 16.7 | 18 | 19 |

As shown in Table 1, the number of drop-outs per minute occurring at each of six points along the longitudinal direction of the tape were 16–19, and this number exceeded 30 at certain points.

The inventors of the present invention have found by optical microscopic investigation of the portions of the tapes where the drop-out phenomenon occurred that 78% of the drop-out was due to the chips scattered from the cut edge portions of the tape and which was adhered to the surface.

EXAMPLE 1

A tape having a width of 25 cm. and a length of 800 mm. was produced in the same manner as in the comparative example. The tape was cut by a lap-around shear cutting system into four video tapes having a width of 50.8 mm. in the same way as in the comparative example. However, in this example, the cut edge surfaces of the video tapes were treated with methyl ethyl ketone before the tapes were reeled so as to round off the cut edges as shown in FIG. 3.

EXAMPLE 2

In the same way as Example 1, four magnetic video tapes having a width of 50.8 mm. were prepared by cutting the tape of 25 cm. in width and 800 mm. in length. The cut edge surfaces of the thus prepared video tapes were treated with butyl acetate before the tapes were reeled so that the edge portions of the tapes were rounded off as shown in FIG. 3. The frequency of the occurrence of the drop-out phenomenon in each instance was measured by a four head video tape recorder of the same type as used in the comparative example. The results are shown in Tables 2 and 3.

TABLE 2

Number of the drop-out in Example 1 (counts of drop-out/min.)

| Position of measurement | Position of cutting: First slit | Second slit | Third slit | Fourth slit |
|---|---|---|---|---|
| 1 | 7 | 6 | 2 | 7 |
| 2 | 4 | 0 | 1 | 5 |
| 3 | 5 | 1 | 1 | 0 |
| 4 | 2 | 1 | 1 | 5 |
| 5 | 3 | 3 | 4 | 1 |
| 6 | 6 | 0 | 5 | 3 |
| Average | 4.5 | 1.8 | 2.3 | 3.5 |

TABLE 3

Number of the drop-out in Example 2 (counts of drop-out/min.)

| Position of measurement | Position of cutting: First slit | Second slit | Third slit | Fourth slit |
|---|---|---|---|---|
| 1 | 5 | 1 | 2 | 11 |
| 2 | 7 | 7 | 0 | 8 |
| 3 | 3 | 10 | 1 | 4 |
| 4 | 0 | 4 | 1 | 4 |
| 5 | 8 | 1 | 7 | 5 |
| 6 | 3 | 1 | 9 | 5 |
| Average | 4.3 | 4 | 3.3 | 6.2 |

As seen from the above tables, the destruction of the magnetic layer cannot be recognized in each of the tapes which were treated with the solvent as shown in Examples 1 and 2 above.

Therefore, the frequency of occurrence of the drop-out phenomenon was significantly reduced in the tapes of Examples 1 and 2 in comparison with the comparative example.

Since methyl ethyl ketone was used as the solvent in Example 1, slight deformations occurred in the base when a large quantity of the solvent was used to treat the side surfaces of the base.

Often defects such as tracking errors were recognized in the tape. On the other hand, no such defects were recognized in the tapes of Example 2 when butyl acetate was used as the solvent.

As described above, stable treatment can be achieved when a solvent which can dissolve only the magnetic layer is used.

The solvent not only dissolves the cut edge surfaces of the magnetic layer when it is treated with the solvent, but at the same time, the treatment can be carried out in such a manner that the dissolved substance is swept away from the tape.

EXAMPLE 3

Similarly, the wide magnetic recording tape of the same size and composition as the comparative example was cut by lap-around shear cutting system to form four video tapes of 50.8 mm. in width. Prior to the reeling of the video tapes, the cut edge surfaces of each of the tapes were coated with a solution comprising a copolymer of vinyl chloride and vinyl acetate (trade name VAGH) dissolved in methyl isobutyl ketone and having a concentration of 4% so that the coating covered the surface of the portion 3 in magnetic layer 2 as shown in FIG. 4. The coating was then dried thereby permitting portion 3 which was destroyed during the cutting operation to be set, hence avoiding the drop-out phenomenon.

The thus treated tapes were tested in the same way as the comparative example of the prior art and the results were as follows:

The average number of drop-outs occurring at the six points along the length of the video tape formed by the first slit cut into the originally prepared tape were 6 point/min.; that of the tape formed by the second slit was 3.5 point/min.; while those of the tapes formed by the third and fourth slits were 4.5 point/min. and 6 point/min., respectively.

EXAMPLE 4

The video tapes having the width of 50.8 mm. were prepared in the same way as Example 3. Prior to the reeling of the tapes, the cut edge surface of the magnetizable layer of each of the tapes were coated with a solution comprising an epoxy resin dissolved in butyl acetate and having a concentration of 5% so that the coating covers portion 3 of magnetizable layer 2 as shown in FIG. 4. The coating was then dried thereby permitting portion 3 to be set so that the number of drop-outs was reduced.

The results in the tests made in the same way as Example 1 showed that the average counts of the drop-out per minute were 4–7.

As described above, the present invention prevents effectively the scattering of the cut chips of the magnetizable layer thereby permitting the occurrence of the drop-out phenomenon to be surprisingly suppressed. The present invention permits the counts of the drop-out to be reduced below about one third of that occurring in the prior art.

No particular composition is required for the coating operations of the present invention. Any coating which can permeate the portion of the magnetic layer which is destroyed by the cutting operation may be used in the present invention.

The following are exemplary of materials which are suitable for use in the present invention, magnetic material: $Fe_2O_4$, $\gamma$-$Fe_2O_3$, $CrO_2$, Co or Ni modified magnetizable Fe-substance. Binder: cellulose nitrate, nitrile rubber, butyl acrylate-acrylonitrile copolymer, polyvinyl acetate, vinylchloride-vinylacetate copolymer, maleic acid modified copolymer of vinylchloride-vinylacetate, epoxy resin, polyamide resin, polyurethane resin, polyacrylate, cellulose acetate butylate, polyvinylidene, fluorine-contained polyhydrocarbon melamine resin, butadiene-acrylonitrile copolymer and mixtures thereof. Material for non-magnetizable web-base: polyvinylchloride, polypropylene, polyethylene terephthalate, and di- or tri-acetyl cellulose. Organic solvent: amyl acetate, amyl propionate, amyl toluene, benzene, n- or iso-butanol, n-, iso- or ter-butyl acetate, n-butyl propionate, carbon tetrachloride, chlorobenzene, chloroform, cyclohexane, cyclohexanol, dipentene, di-iso-propyl ether, ethyl acetate, ethyl benzene, ethyl-n-butyl ketone, ethylene dichloride, ethyl glycol, n-hexane, iso-hexane, methyl amylketone, methyl-n- or iso-butyl ketone, methyl ethyl ketone, n- or iso-propanol, n- or iso-propyl acetate solvent naphtha, toluene, trichlorethane, trichlorethylene, trichloropropane, turpentine or xylene and mixtures thereof.

What is claimed is:

1. In a method for producing a magnetic recording medium by coating a magnetic recording layer consisting of particles of a magnetic material dispersed in a binder of a copolymer of vinyl chloride and vinyl acetate, onto a non-magnetizable web-base of a material consisting of polyethylene terephthalate, tri-acetyl cellulose, polypropylene, polyvinyl chloride or diacetyl cellulose, and thereafter cutting the assembly thus formed into strips having a desired width, the improvement which comprises smoothing the cut edges of said magnetic recording layer of said strip by treating said edges with a volatile organic solvent capable of dissolving said binder, said solvent being selected from the group consisting of butyl acetate and methylethyl ketone.

2. In a method for producing a magnetic recording medium by coating a magnetic recording layer consisting of particles of a magnetic material dispersed in a binder selected from the group consisting of cellulose nitrate, nitrile rubber, a butyl acrylate-acrylonitrile copolymer, polyvinyl acetate, a vinyl chloride-vinyl acetate copolymer, a maleic acid-modified copolymer of vinyl chloride-vinyl acetate, an epoxy resin, a polyamide resin, a polyurethane resin, poly acrylate, cellulose acetate butylate, polyvinylidene, a fluorine-containing polyhydrocarbon melamine resin, a butadiene-acrylonitrile copolymer and mixtures thereof, onto a non-magnetizable web-base consisting of tri- or di-acetyl cellulose, polyethylene terephthalate, polypropylene or polyvinyl chloride, thereafter cutting the assembly so formed into strips having a desired width, the improvement which comprises smoothing the cut edges of said magnetic recording layer of said strip by coating said edges with a resinous coating composition, said resinous coating composition comprising the same material as said binder and a volatile solvent.

3. In a method for producing a magnetic recording medium by coating a magnetic recording layer consisting of particles of a magnetic material dispersed in a synthetic resin binder, onto a synthetic resin film base, and thereafter cutting the coated film base into strips having a desired width, the improvement which comprises smoothing the longitudinal cut edges of said magnetic recording layer of the strip by treating said edges with a volatile organic solvent capable of dissolving said binder.

4. The method of claim 3 wherein said synthetic resin film base is a member selected from the group consisting of polyethylene terephthalate, tri-acetyl cellulose, polypropylene and polyvinyl chloride.

5. The method of claim 3, wherein said binder is a copolymer of vinylchloride and vinyl acetate.

6. The method of claim 3, wherein said organic solvent is a member selected from the group consisting of butyl acetone and methyl-ethyl ketone.

7. In a method for producing a magnetic recording medium by coating a magnetic recording layer consisting of particles of a magnetic material dispersed in a synthetic resin binder, onto a synthetic resin film base, and thereafter cutting the coated film base into strips having a desired width, the improvement which comprises smoothing the longitudinal cut edges of said magnetic recording layer of the strip by coating said edges with a resinous coating composition.

8. The method of claim 7 wherein said synthetic resin film base is a member selected from the group consisting of polyethylene terephthalate, tri-acetyl cellulose, polypropylene and polyvinyl chloride.

9. The method of claim 7 wherein said binder is a copolymer of vinyl chloride and vinyl acetate.

10. The method of claim 7, wherein said resinous composition comprises a material having the same composition as that of the binder used for the magnetic layer and a volatile solvent.

References Cited

UNITED STATES PATENTS

| | | | |
|---|---|---|---|
| 2,688,567 | 9/1954 | Franck | 117—237 |
| 3,347,362 | 10/1967 | Rabuse et al. | 117—43X |
| 3,398,011 | 8/1968 | Neirotti et al. | 117—237 |
| 1,773,968 | 8/1930 | Dreyfus | 117—4 |
| 3,179,533 | 4/1965 | Rusch | 117—140 |

WILLIAM D. MARTIN, Primary Examiner

B. D. PIANALTO, Assistant Examiner

U.S. Cl. X.R.

117—2, 4, 44